United States Patent [19]

Okada et al.

[11] Patent Number: 4,670,849

[45] Date of Patent: Jun. 2, 1987

[54] POSITION ERROR CORRECTING METHOD AND APPARATUS FOR INDUSTRIAL ROBOT

[75] Inventors: Takushi Okada; Shunji Mohri, both of Yokohama, Japan

[73] Assignee: Hitachi, Ltd., Tokyo, Japan

[21] Appl. No.: 595,363

[22] Filed: Mar. 30, 1984

[30] Foreign Application Priority Data

Mar. 31, 1983 [JP] Japan .................................. 58-53969
Mar. 31, 1983 [JP] Japan .................................. 58-53970

[51] Int. Cl.$^4$ ....................... G06F 15/46; G05B 13/00
[52] U.S. Cl. .................................... 364/513; 364/170; 364/192; 364/731; 318/632; 901/3; 901/15
[58] Field of Search ................ 364/167, 170, 191-193, 364/513, 731; 318/568, 632; 901/3, 15

[56] References Cited

U.S. PATENT DOCUMENTS

| | | | |
|---|---|---|---|
| 3,986,007 | 10/1976 | Ruoff, Jr. ............................. | 364/513 |
| 3,986,010 | 10/1976 | Lankford et al. .................... | 364/170 |
| 4,025,838 | 5/1977 | Watanabe ............................ | 318/568 |
| 4,362,977 | 12/1982 | Evans et al. ......................... | 364/513 |
| 4,382,215 | 5/1983 | Barlow et al. ....................... | 318/632 |
| 4,402,053 | 8/1983 | Kelley et al. ........................ | 364/513 |
| 4,481,592 | 11/1984 | Jacobs et al. ........................ | 364/191 |
| 4,495,588 | 1/1985 | Nio et al. ............................ | 364/513 |
| 4,517,653 | 5/1985 | Tsuchihashi et al. ............... | 364/193 |
| 4,543,635 | 8/1985 | Joó et al. ............................. | 364/731 |

OTHER PUBLICATIONS

"Method of Calibrating Coordinate System for Multi--Articulated Robot," S. Kawakami et al., 1982 Spring Convention, Precision Machinery Society Papers for Lectures, vol. 2, pp. 587-589.

Primary Examiner—Jerry Smith
Assistant Examiner—John R. Lastova
Attorney, Agent, or Firm—Fay, Sharpe, Beall, Fagan, Minnich & McKee

[57] ABSTRACT

A position error correcting method and apparatus suitable for operating an industrial robot with high accuracy, in which, after the industrial robot disposed on a working site is moved according to position command values, the moved position of a measurement point on the industrial robot is measured three-dimensionally, and a position error of the industrial robot between the robot coordinate system relating to the operation of the industrial robot and the absolute coordinate system of the industrial robot on its working site is computed by comparing the measured position values of the measurement point with the position command values. The work program prepared for the operation of the industrial robot is modified on the basis of the computed position error so that the industrial robot can be operated in accordance with the work program from which the source of the position error has been eliminated.

25 Claims, 12 Drawing Figures

POSITION ERROR CORRECTING METHOD AND APPARATUS FOR INDUSTRIAL ROBOT

BACKGROUND OF THE INVENTION

This invention relates to a position error correcting method and an apparatus for an industrial robot, and more particularly to a method and an apparatus suitable for eliminating errors of the position of an industrial robot attributable to the difference between the robot coordinate system relating to the operation of the industrial robot and the absolute coordinate system of the industrial robot on its working site so that the industrial robot can operate with high accuracy.

For the purpose of controlled operation of an industrial robot, it has been the common practice to prepare a series of robot operation data by teaching and to control the operation of the industrial robot on the basis of the operation data acquired by teaching, and importance has thus been set on the repeatability of the same operation according to the operation data provided by teaching rather than the absolute accuracy of operation according to commanded numerical values.

However, with the recent progress of the so-called factory automation (FA) promoting the automation of various factory operations, an attempt has been started in which the teaching period of time requiring the hands of the operator is eliminated from the operating period of time of an industrial robot, and numerical data prepared offline are used for more efficiently operating the industrial robot. In the case of such an attempt, the capability of control of the robot as commanded by the numerical data, that is, the absolute accuracy becomes a matter of primary importance.

Prior art examples proposed for improving the absolute accuracy of an industrial robot include an apparatus in which values of position errors are previously stored to be read out when error correction is to be done, as, for example, disclosed in Japanese Patent Application Laid-open No. 57-76608 entitled "Position Error Correcting Apparatus" and filed by Fujitsu Fanac Corporation in Japan and Japanese Patent Application Laid-open No. 57-75310 entitled "Position Error Detecting Apparatus for Numerically Controlled Machine Tools" and filed also by Fujitsu Fanac Corporation.

As another prior art example, there is a proposal in which the space is divided into a plurality of small regions, and an error function is computed for each of the individual small regions for the purpose of error correction. However, this proposal is defective in that much time and labor are required for the computation, storage, etc. of the error functions.

As a prior art example designed for measurement of the robot coordinate system peculiar to an industrial robot and the absolute coordinate system of the industrial robot on its working site, there is an apparatus for measuring the position of a robot moving on a plane relative to a work plane as, for example, disclosed in Japanese Patent Application Laid-open No. 57-75793 entitled "Robot Relative Position Measuring Apparatus" and filed by Nippon Denki Co., Ltd. in Japan. However, the proposed apparatus cannot measure the spatial (three-dimensional) relative position of the robot.

As a prior art example proposed for detection of an installation error, a mechanism error and an encoder error of an industrial robot, there is a method entitled "Method of Calibration of Coordinate System of Multiarticulated Robot" and reported by S. Kawakami, et al. of Fujitsu Research Institute, Ltd. in "Reports on Scientific Lectures in Spring Meeting of the Society of Precision Machines, 1982, Vol.2, pp.587–589." However, the proposed method does not include measurement of the error of the arm mounting angle among the parameters of the robot and is not, therefore, applicable to robots including such an error. Further, the proposal does not refer to any procedure for elimination of the adverse effects of the various errors above described after measurement of the errors.

SUMMARY OF THE INVENTION

It is a primary object of the present invention to provide a method and an apparatus suitable for eliminating a spatial (three-dimentional) error of the position of an industrial robot, of which error occurs when the industrial robot operating with its own coordinate system is disposed on a working site represented by the absolute coordinate system, so that the industrial robot can operate with high accuracy.

The present invention is featured by the fact that the working point of an industrial robot disposed on a working site is moved three-dimensionally according to position command values, the position of the three-dimensionally moved working point is measured to obtain measured position values which are compared with the position command values to compute the position error, if any, of the industrial robot, and, on the basis of the computed position error, the work program of the industrial robot is modified, so that the position error can be previously eliminated from the work program to ensure accurate operation of the industrial robot.

DESCRIPTION OF THE PREFERRED EMBODIMENT

Command data commanding the operation of an industrial robot are generally supplied as values of the absolute coordinate system of the industrial robot belonging to a specific working site. On the other hand, the industrial robot operates necessarily according to the command data provided by coordinate transformation into the robot coordinate system peculiar to the industrial robot. Suppose that the robot coordinate system and the absolute coordinate system do not conform to eack other for some reason. In such a case, even when command data are externally supplied to operate the industrial robot within the extent of the robot coordinate system according to the externally supplied command data, the industrial robot will not necessarily operate as commanded on the absolute coordinate system peculiar to the working site, and the absolute accuracy of the industrial robot may not be guaranteed.

Although it is desirable that the two coordinate systems conform to each other, an installation error may arise during the installation of the industrial robot on the working site. Further, when the mechanism parameters such as the length and mounting angle of the arms of the industrial robot include errors from the designed values, the robot will not operate accurately as commanded by the command data even when the command data are prepared on the basis of the designed values. Further, although the zero adjustment of the encoders is commonly initially made for the industrial robot to conform the robot coordinate system to the absolute coordinate system, an encoder error which may arise during this zero adjustment will also provide the source of non-conformity between the two coordinate systems.

According to the present invention, the position of an industrial robot is measured to previously find errors such as those above described, and, on the basis of the detected errors, the work program of the industrial robot is modified in advance so that the industrial robot can operate with high accuracy.

A preferred embodiment of the present invention will now be described in detail with reference to the drawings.

Figure 1:
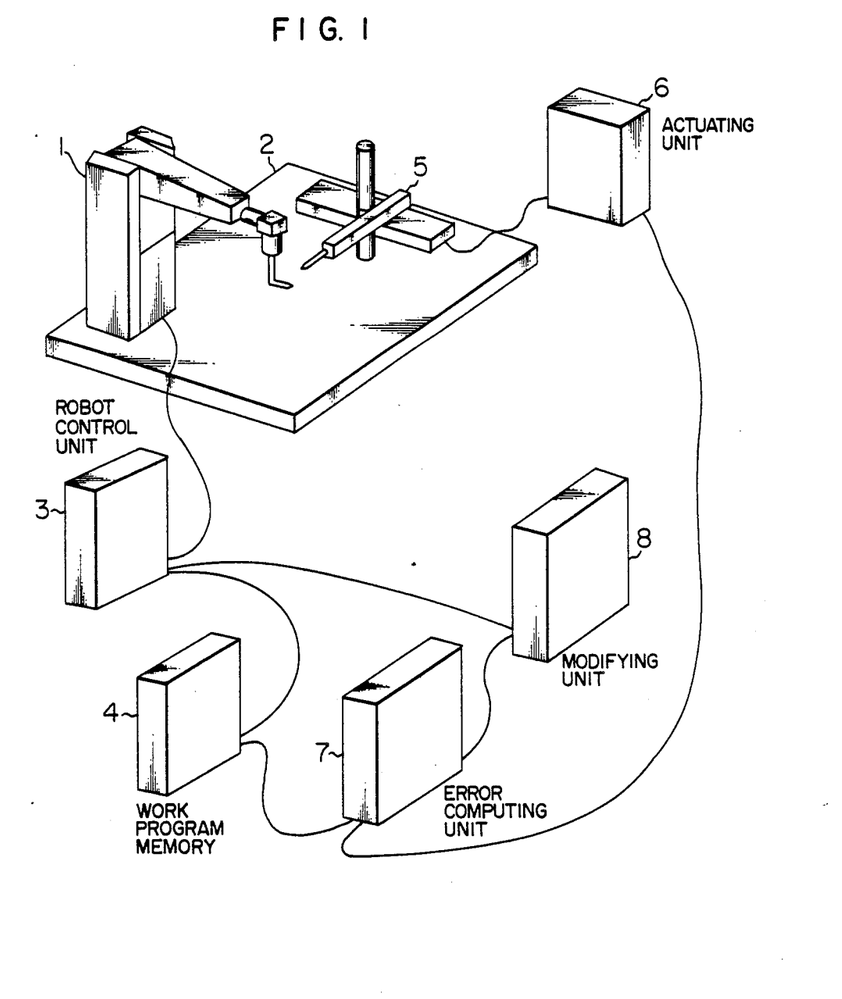
FIG. 1 is a schematic perspective view showing the relation between an industrial robot and an embodiment of the position error correcting apparatus according to the present invention.

FIG. 1 is a schematic perspective view showing the relation between an industrial robot and an embodiment of the position error correcting apparatus according to the present invention. Referring to FIG. 1, the industrial robot 1 is installed on a working site 2 to operate under control of a control device 3 in accordance with a work program stored in a work program memory device 4. The position error correcting apparatus comprises a three-dimensional measuring unit 5 adapted for three-dimensional measurement of the position of the industrial robot 1, an actuating unit 6 actuating this three-dimensional measuring unit 5, an error computing unit 7 computing a position error on the basis of the measured position values of the industrial robot 1, and a modifying unit 8 modifying the work program on the basis of the computed position error.

Figure 2:
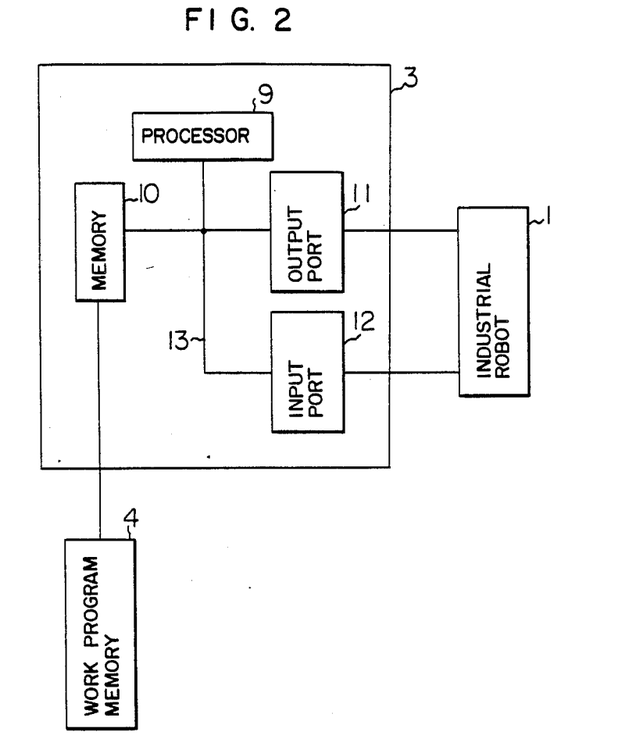
FIG. 2 is a block diagram showing the structure of the control device controlling the industrial robot.
Figure 3:
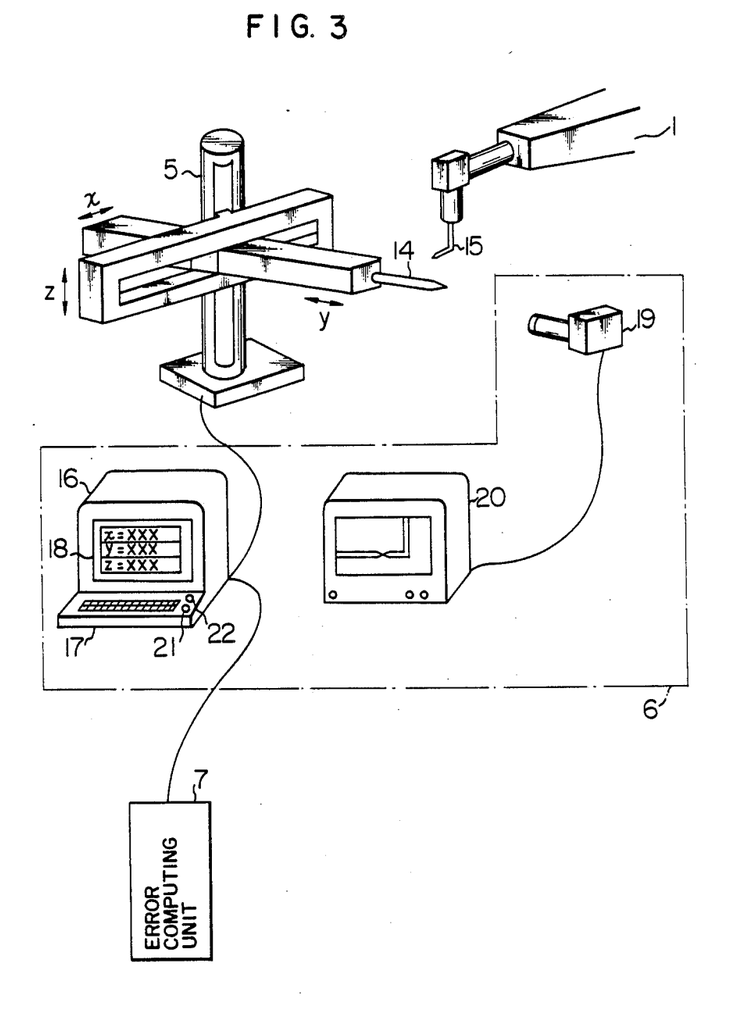
FIG. 3 is a schematic perspective view showing one form of the three-dimensional measuring unit and one form of the actuating unit in the position error correcting apparatus of the present invention.

The position error of the industrial robot 1 is measured in a manner as will be described now. As shown in FIG. 2, the control device 3 includes a processor 9 connected by a bus 13 to a memory 10 and to an output port 11 and an input port 12 constituting an input/output interface between the control device 3 and the industrial robot 1. The processor 9 fetches initially the measurement-purpose position command values stored in the work program memory device 4, and, after coordinate transformation into those of the robot coordinate system, supplies the position command values to the industrial robot 1 so as to move the industrial robot 1 to the commanded position for measurement. Then, as shown in FIG. 3, the three-dimensional measuring unit 5 is actuated under control of a control part 16 of the actuating unit 6. More precisely, in response to the application of x, y and z coordinates from a console 17, the control part 16 displays the coordinate values on a display screen 18 and, at the same time, applies command signals indicative of the values of the x, y and z coordinates to pulse motors (not shown) provided for moving the three-dimensional measuring unit 5 in the x, y and z directions, so that the three-dimensional measuring unit 5 can be moved to the commanded space position (x, y, z). The actuating unit 6 includes a TV camera 19 by which the image of a measuring stylus 14 of the three-dimensional measuring unit 5 and that of the front end 15 of the hand of the industrial robot 1 are displayed on the screen of a monitor TV 20. While looking at the screen of the monitor TV 20, the measurer applies the command signals from the console 17 to actuate the three-dimensional measuring unit 5 until the measuring stylus 14 is brought into point-to-point engagement with the front end 15 of the hand of the industrial robot 1. The TV camera 19 may be a stationary one. However, when the field of vision of the TV camera 19 cannot cover the entire movable range of the industrial robot 1, the TV camera 19 may be mounted on, for example, the three-dimensional measuring unit 5 or the robot hand. Also, in order to more positively confirm the point-to-point engagement between the measuring stylus 14 and the front end 15 of the robot hand, the magnification of the TV camera 19 may be magnified by means such as a zoom lens or the engagement may be confirmed by means such as an electrical signal. Upon completion of the position measurement, the measurer depresses a reset key 21 to store the measured coordinate values (x, y, z) in a memory of the control part 16, which completes one measurement. Upon completion of required number of times of measurement, the measurer depresses an end key 22 thereby transferring the measured coordinate values to the error computing unit 7.

Figure 4:
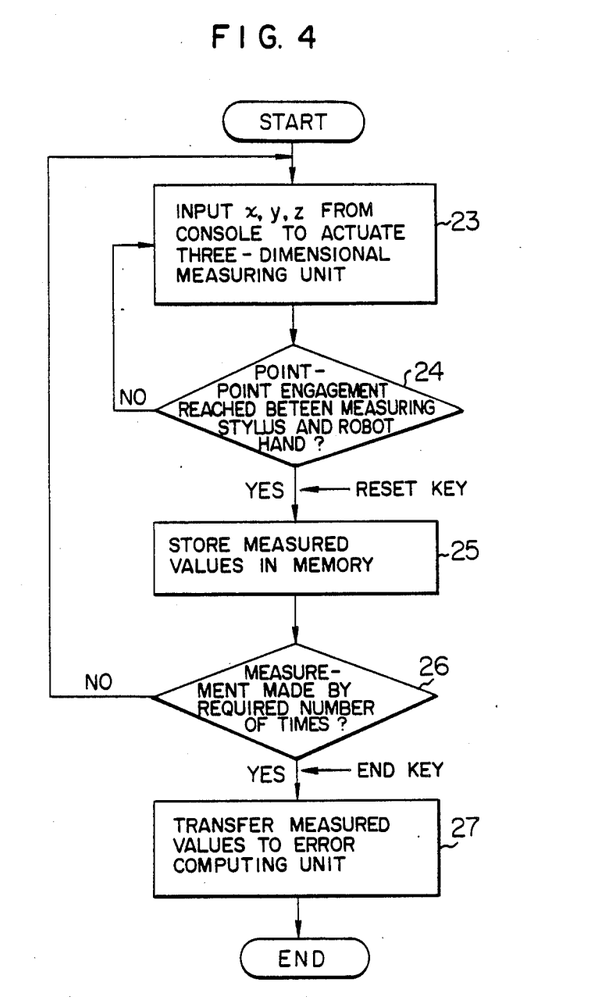
FIG. 4 is a flowchart showing the steps of processing during measurement of the position of the industrial robot.

FIG. 4 is a flowchart showing the steps of processing described with reference to FIG. 3. Referring to FIG. 4, the coordinate values (x, y, z) are commanded from the console 17 to actuate the three-dimensional measuring unit 5, in the block 23. In the block 24, judgment is made as to whether or not the measuring stylus 14 is brought into point-to-point engagement with the front end 15 of the robot hand. When the result of judgment in the block 24 is "YES", the reset key 21 is depressed to store the measured coordinate values in the memory of the control part 16, in the block 25. In the block 26, judgment is made as to whether or not the required number of times of measurement have been completed. When the result of judgment in the block 26 is "YES", the end key 22 is depressed to transfer the measured coordinate values to the error computing unit 7, in the block 27.

Figure 5:
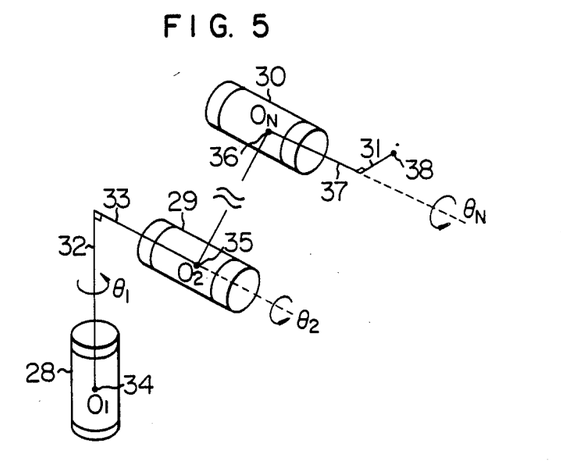
FIG. 5 is a conceptual diagram showing the mechanism of the industrial robot of N-axis multi-articulated type.

How to compute an installation error, a mechanism error and an encoder error will next be described with reference to the case where the industrial robot 1 is of the N-axis multi-articulated type. FIG. 5 is a conceptual diagram showing the mechanism of such a robot.

Figure 6:
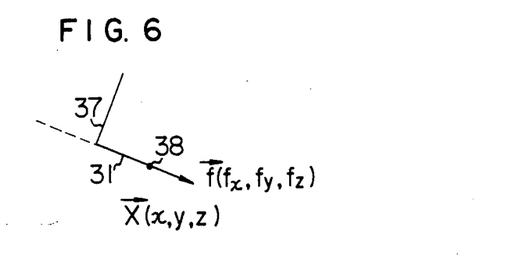
FIG. 6 is a conceptual diagram showing the coordinates and attitude of the hand of the industrial robot.

Referring to FIG. 5, a first axis 28 and a second axis 29 are articulated by arms 32 and 33 perpendicular to each other. The first and second axes 28 and 29 rotate with rotation angles $\theta_1$ and $\theta_2$ on the arms 32 and 33 respectively. The multi-articulated robot is formed by successive articulation of such rotary axes. An arm 37 and a robot hand 31 are mounted on the end of an N-th axis 30. Position command values used for measurement are generally indicative of the coordinate values at the point 38 of the front end of the robot hand 31. Coordinate values $\vec{X}$ (x, y, z) and attitude vectors $\vec{f}$ (fx, fy, fz) indicative of the attitude of the point 38 in the three independent directions in the space are generally provided as the position command values during measurement as shown in FIG. 6. The position command values $\vec{X}$ (x, y, z) and $\vec{f}$ (fx, fy, fz) stored in the work program memory device 4 are supplied to the memory 10 in the control device 3, and the processor 9 computes the rotation angles $\theta_1, \theta_2, \ldots, \theta_N$ of the first, second, ..., N-th axes 28, 29, ..., 30 respectively, so as to cause rotation of the motors of the industrial robot 1 as commanded by the signals applied through the input port 11 of the control device 3. Thus, when the industrial robot 1 is free from any one of installation, mechanism and encoder errors, the robot hand 31 moves accurately toward the point 38.

Figure 7:
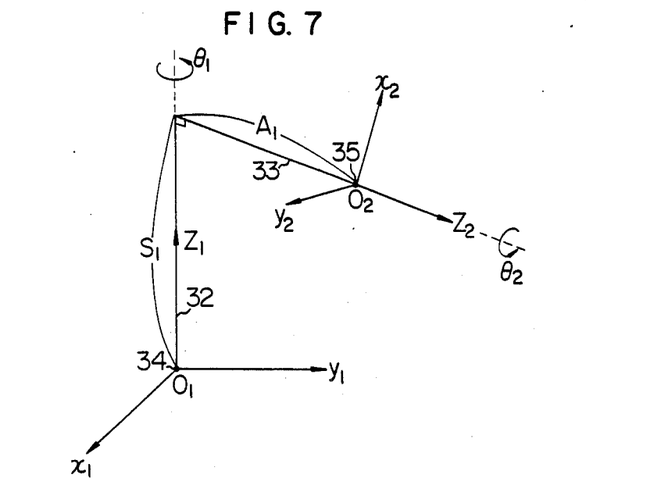
FIG. 7 is a diagram illustrating the relation between the coordinate system of the first axis and that of the second axis of the industrial robot.

FIG. 7 is a diagram illustrating the relation between the coordinate system of the first axis 28 and that of the second axis 29 of the industrial robot. In terms of a cylindrical coordinate system, there is the following positional relation between the origin $\vec{O}_1$ 34 of the coordinate system of the first axis 28 and the origin $\vec{O}_2$ 35 of the coordinate system of the second axis 29:

$$\vec{O}_2 S \vec{Z}_1 + A_1 (\vec{x}_1 \cos \theta_1 + \vec{y}_1 \sin \theta_1) + \vec{O}_1 \quad (1)$$

where $\theta_1$ is the rotation angle of the first axis 28, and $S_1$ and $A_1$ are the lengths of the respective arms 32 and 33 perpendicular to each other. The symbols $\vec{x}_1, \vec{y}_1$ and $\vec{z}_1$ designate the direction vectors of the $\vec{x}, \vec{y}$ and $\vec{z}$ axes of the coordinates system of the first axis 28 respectively, and these direction vectors $\vec{x}_1, \vec{y}_1$ and $\vec{z}_1$ have the following relation with the direction vectors $\vec{x}_2, \vec{y}_2$ and $\vec{z}_2$ of the coordinate system of the second axis 29:

$$\begin{bmatrix} \vec{x}_2 \\ \vec{y}_2 \\ \vec{z}_2 \end{bmatrix} = M_{\gamma 1} M_{\beta 1} M_{\alpha 1} \begin{bmatrix} \vec{x}_1 \\ \vec{y}_1 \\ \vec{z}_1 \end{bmatrix} \quad (2)$$

In the expression (2), $M_{\alpha 1}$, $M_{\beta 1}$ and $M_{\gamma 1}$ designate the three-rows three-columns rotation matrices indicative of rotation in the directions of $\vec{x}_1, \vec{y}_1$ and $\vec{z}_1$ respectively and are expressed as follows:

$$M_{\alpha 1} = \begin{bmatrix} 1 & 0 & 0 \\ 0 & \cos\alpha_1 & \sin\alpha_1 \\ 0 & -\sin\alpha_1 & \cos\alpha_1 \end{bmatrix} \quad (3)$$

$$M_{\beta 1} = \begin{bmatrix} \cos\beta_1 & 0 & -\sin\beta_1 \\ 0 & 1 & 0 \\ \sin\beta_1 & 0 & \cos\beta_1 \end{bmatrix} \quad (4)$$

$$M_{\gamma 1} = \begin{bmatrix} \cos\gamma_1 & \sin\gamma_1 & 0 \\ -\sin\gamma_1 & \cos\gamma_1 & 0 \\ 0 & 0 & 1 \end{bmatrix} \quad (5)$$

In the expressions (3), (4) and (5), $\alpha_1$, $\beta_1$ and $\gamma_1$ designate the rotation angles of the x, y and z axes in the coordinate system of the first axis 28 respectively.

When such axes are successively articulated, the coordinates $\vec{X}$ of the point 38 of the robot hand 31 are expressed as follows:

$$\vec{X} = \sum_{i=1}^{N} \{S_i \vec{Z}_i + A_i (\vec{X}_i \cos \theta_i + \vec{y}_i \sin \theta_i)\} \quad (6)$$

The lengths of the arm 37 and robot hand 31 at the N-th axis 30 of the industrial robot are designated by $S_N$ and $A_N$ respectively. The equation (6) determining the coordinates $\vec{X}$ of the point 38 of the robot hand 31 includes the mechanism parameters Si, Ai, $\alpha_i$, $\beta_i$ and $\gamma_i$. Therefore, when these parameters include errors from their designed values, the coordinates $\vec{X}$ deviate from the commanded values. The errors $\Delta S_i$, $\Delta A_i$, $\Delta \alpha_i$, $\Delta \beta_i$, and $\Delta \gamma_i$, if any, of the mechanism parameters Si, Ai, $\alpha_i$, $\beta_i$, and $\gamma_i$ from their designed values will be referred to hereinafter as mechanism errors.

Also, the equation (6) includes the rotation angle $\theta_i$ of each of the axes. Since the value of $\theta_i$ is a relative value computed in relation to a certain origin, it is necessary to initially determine the origin on the basis of which the angle $\theta_i$ is computed. Since, in this case, there is a possibility of giving rise to a zero adjustment error $\Delta \theta_i$, this error will be referred to hereinafter as an encoder error.

Figure 8:
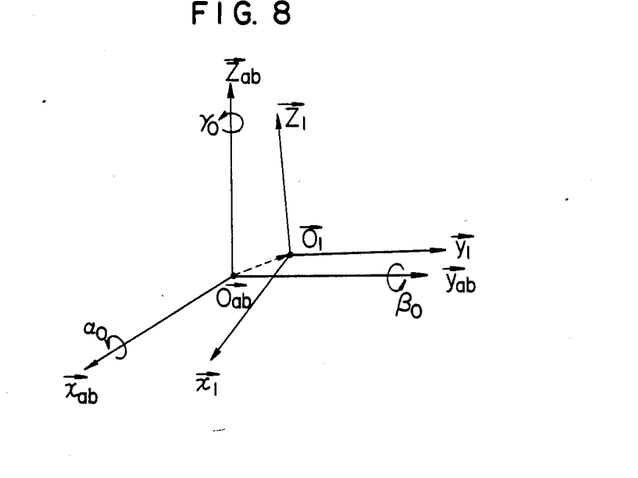
FIG. 8 is a diagram illustrating the relation between the absolute coordinate system of the industrial robot on the working site and the coordinate system of the first axis of the industrial robot.

FIG. 8 is a diagram illustrating the relation between the absolute coordinate system of the industrial robot on its working site and the coordinate system of the first axis of the industrial robot. An error, if any, between these two coordinate systems is referred to hereinafter as a robot installation error. This installation error is expressed as errors of six parameters, of which three represent relative displacement between the origins $\vec{O}_{ab}$ and $\vec{O}_1$, and the remainder represent rotational displacement between the coordinate axes. These six parameters are defined as So, Ao, $\alpha$o, $\beta$o, $\gamma$o and $\theta$o so that the installation errors can be handled in the same manner as the mechanism errors and encoder errors, and the installation errors are expressed by $\Delta$So, $\Delta$Ao, $\Delta\alpha$o, $\Delta\beta$o, $\Delta\gamma$o and $\Delta\theta$o respectively. The equation (6) gives the coordinates X of the robot hand relative to the origin $\vec{O}_1$ of the coordinate system of the first axis 28 of the industrial robot. When the installation parameters described above are further taken into account, the coordinates $\vec{X}_{ab}$ of the robot hand relative to the origin $\vec{O}_{ab}$ of the absolute coordinate system of the industrial robot on its working site are expressed as follows:

$$\vec{X}_{ab} = \sum_{i=0}^{N} \{S_i \vec{Z}_i + A_i (\vec{X}_i \cos \theta_i + \vec{y}_i \sin \theta_i)\} \quad (7)$$

Therefore, when the industrial robot includes the installation errors, mechanism errors and encoder errors, the position of the coordinates $\vec{X}_{ab}$ of the robot hand deviates from the position given in the robot coordinate system through equation (6) by $\Delta \vec{X}_{ab}$ from the position given by the equation (7). In the embodiment of the present invention, the position deviation $\Delta \vec{X}_{ab}$ from the position given by the equation (7) is measured to find the above errors. Thus, when the parameters included in the equation (7) are collectively expressed by the symbol P and errors thereof are expressed by P, the equation (7) can be expressed as a function of P as follows:

$$\vec{X}_{ab} = \vec{X}_{ab}(P) \tag{8}$$

The following relation holds when the position of $\vec{X}_{ab}$ deviates by $\Delta \vec{X}_{ab}$ when the parameters P include errors $\Delta P$:

$$\vec{X}_{ab} + \Delta \vec{X}_{ab} = \vec{X}_{ab}(P + \Delta P) \tag{9}$$

Herein, it is assumed that the errors $\Delta P$ of P are sufficiently small compared with P. This assumption is rational since the errors, for example, the mechanism errors of the industrial robot can be expected to be sufficiently small compared with the designed mechanism values. Expansion of the right side of the equation (9) for $\Delta P$ and linear approximation to leave the term of first order only provides the following equation:

$$\Delta \vec{X}_{ab} = \sum_{P} \frac{\partial \vec{X}_{ab}(P)}{\partial P} \Delta P \tag{10}$$

where $$\sum_{P}$$

represents the sum total of the parameters P, and $\partial \vec{X}_{ab}(P)/\partial P$ represents the partial differential of $\vec{X}_{ab}(P)$ for P. Suppose, for example, that the parameter $S_1$ only among all the parameters includes an error $\Delta S_1$. Then, the equation (9) can now be expressed as follows:

$$\Delta \vec{X}_{ab} = \frac{\partial \vec{X}_{ab}}{\partial S_1} \cdot \Delta S_1 \tag{11}$$

Since the deviation $\Delta \vec{X}_{ab}$ in the equation (10) is measurable and $\partial \vec{X}_{ab}(P)/\partial P$ in the equation (10) is computable from the equation (7), the equation (10) provides simultaneous linear equations in which $\Delta P$ are variables. Therefore, by providing equations the number of which is more than that of $\Delta P$, all of the errors $\Delta P$ can be computed by solving the simultaneous linear equations (10).

As described hereinbefore, the errors $\Delta P$ include six installation errors $\Delta S_o$, $\Delta A_o$, $\Delta \alpha_o$, $\Delta \beta_o$, $\Delta \gamma_o$ and $\Delta \theta_o$, 5N mechanism errors $\Delta S_i$, $\Delta A_i$, $\Delta \alpha_i$, $\Delta \beta_i$ and $\Delta \gamma_i$ ($i=1, \ldots, N$) of the axes ranging from the first axis to the N-th axis, and N encoder errors $\theta_1, \ldots, \theta_N$. However, all of these errors are not always independent of one another. Herein, an error is said to be independent of others when a robot-hand position error attributable to the specific error is different from those attributable to the others. That is, it means that the partial differential coefficient is linearly independent of others or is not expressed by the sum of, difference between or constant times the other partial differential coefficients. It is apparent that linearly independent errors only are provided by solving the simultaneous linear equations (10). Such linearly independent errors can be obtained by computing the partial differential coefficients of the simultaneous linear equations (10) for each of the individual parameters and selecting linearly independent ones only from among them.

It is supposed herein that there are M linearly independent errors. How to compute these M errors by the error computing unit 7 will now be described.

Figure 9:
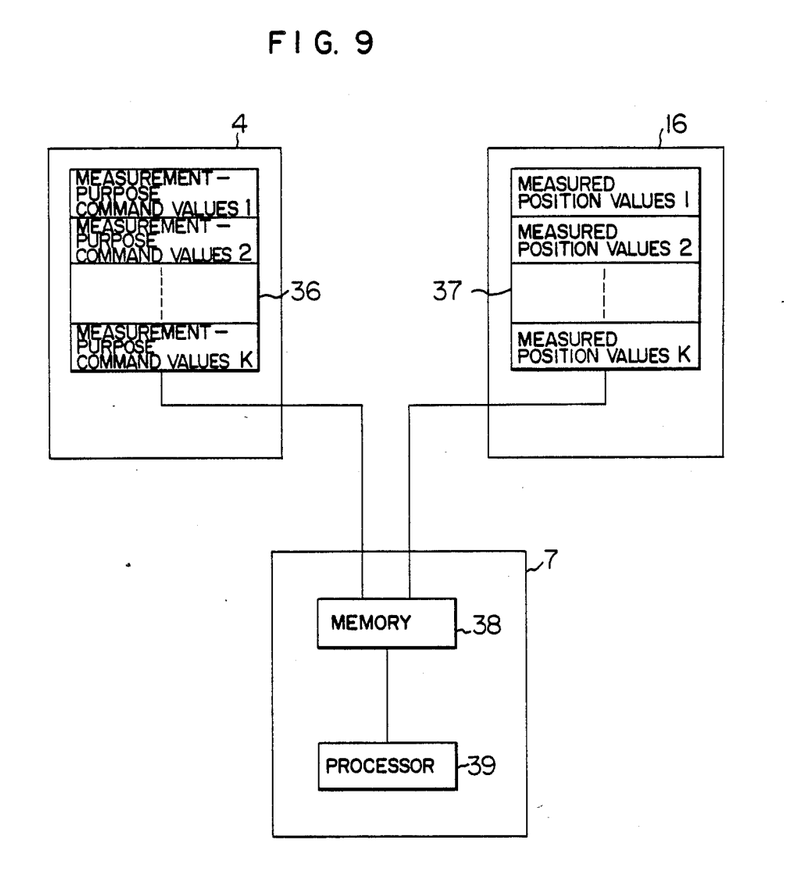
FIG. 9 is a block diagram showing how the error computing unit including a memory and a processor therein is associated with the work program memory device and with the control part of the actuating unit actuating the three-dimensional measuring unit in the apparatus of the present invention.

FIG. 9 shows the structure of the error computing unit 7 including a memory 38 and a processor 39 therein and shows also the structure of the work program memory device 4 together with the structure of the control part 16 in the actuating unit 6 actuating the three-dimensional measuring unit 5. Measurement-purpose position command values used for measurement of the position of the industrial robot 1 are stored in a memory 36 of the work program memory device 4, and the robot control device 3 reads out sequentially these position command values from the memory 36 for operating the industrial robot 1. The three-dimensional measuring unit 5 is actuated under control of the control part 16 of the actuating unit 6 to sequentially measure the actually moved position of the robot hand, and the measured position values are stored in a memory 37 of the control part 16. As will be apparent from the simultaneous linear equations (10), one measurement provides x, y and z components of position deviation, that is, one measurement provides three equations. Therefore, measurement at more than M/3 points is merely necessary for the computation of M errors. The data stored in the memories 36 and 37 are transferred to the memory 38 in the error computing unit 7, and the processor 39 computes errors. The results of computation by the processor 39 are stored in a part of the memory 38.

Figure 10:
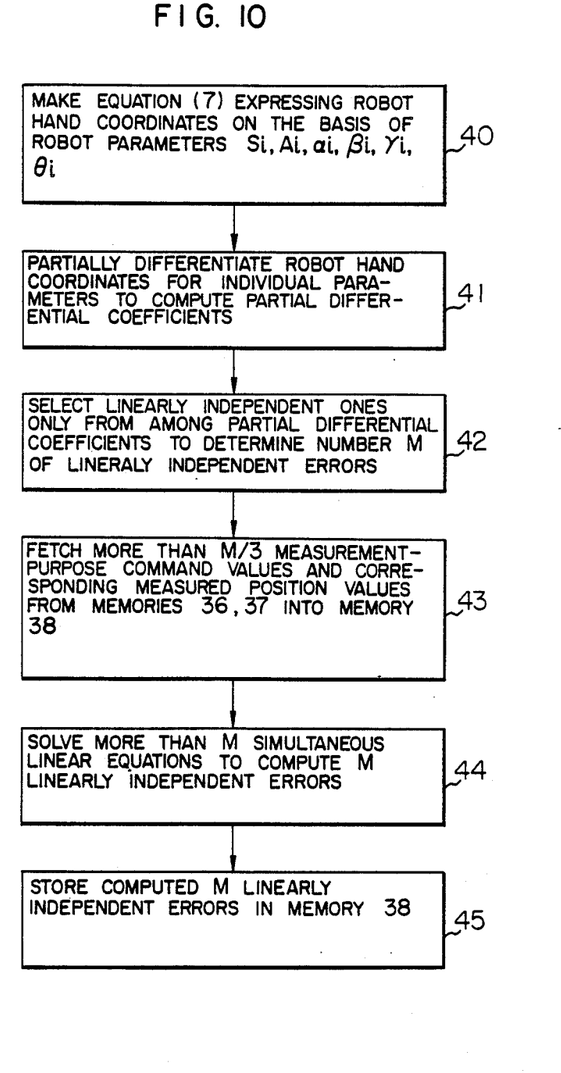
FIG. 10 is a flowchart showing the steps of processing for the error computation executed in the error computing unit.

FIG. 10 is a flowchart showing the steps of processing for the error computation executed in the processor 39. In the block 40, the equation (7) giving the coordinates of the robot hand is made on the basis of the robot parameters $S_i$, $A_i$, $\alpha_i$, $\beta_i$, $\gamma_i$ and $\theta_i$. In the block 41, the coordinates of the robot hand are partially differentiated for each of the parameters to compute the partial differential coefficients. In the block 42, linearly independent ones only are selected from among the computed partial differential coefficients to determine the number M of linearly independent errors. In the block 43, more than M/3 measurement-purpose position command data and corresponding measured position data are transferred to the memory 38 from the respective memories 36 and 37. In the block 44, more than M simultaneous linear equations thus obtained are solved to compute M linearly independent errors. In the block 45, the computed M linearly independent errors are stored in the memory 38.

In the flowchart of FIG. 10, more than M/3 data are transferred to the memory 38 from each of the memories 36 and 37, because one measurement can provide measured values of the x, y and z components of position deviation as described hereinbefore. When it is additionally possible to measure the three components, $\vec{f}=(f_x, f_y, f_z)$, of the attitude of the robot hand, the number of required points of measurement can be reduced to M/6. Further, although all of the installation errors, mechanism errors and encoder errors are computed in the flowchart of FIG. 10, it is apparent that especially desired ones of them can be selectively computed.

The procedure for modifying the work program stored in the work program memory device 4 by the function of the modifying unit 8 on the basis of the installation errors, mechanism errors and encoder errors computed in the manner above described thereby eliminating the adverse effects attributable to the above errors, will be described with reference to FIG. 11.

Figure 11:
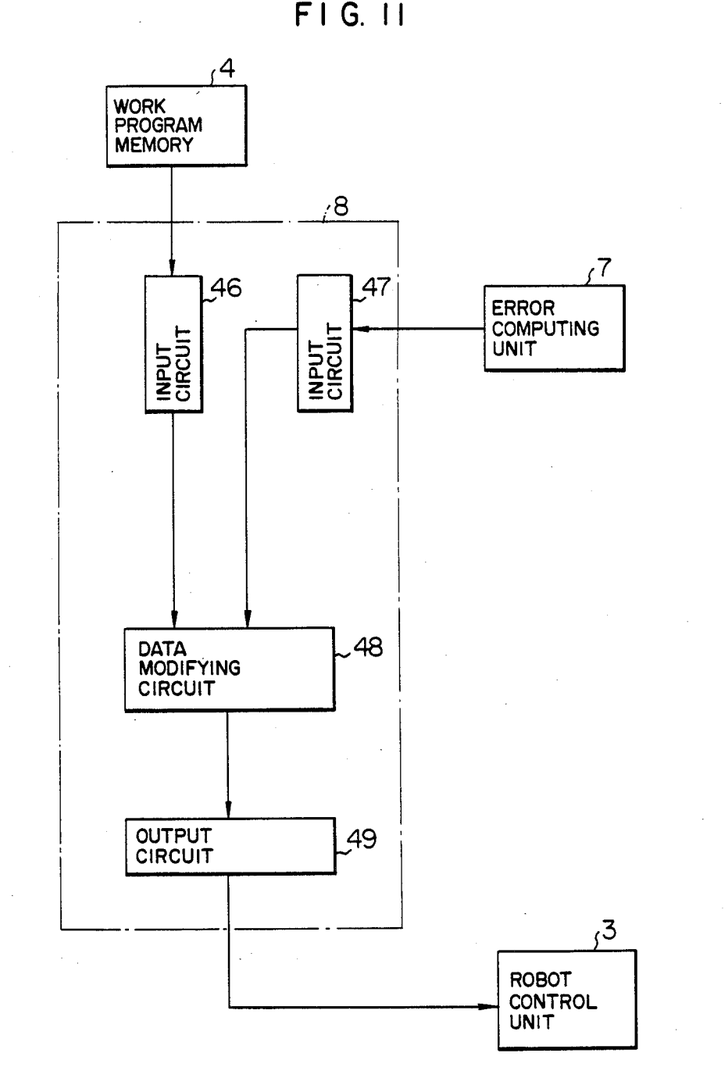
FIG. 11 is a block diagram showing how the error is eliminated from the work program.

Referring to FIG. 11, the work program stored in the work program memory device 4 is set in an input circuit 46 in the modifying unit 8. The parameter errors computed by the error computing unit 7 are also set in another input circuit 47 in the modifying unit 8. The values set in the input circuits 46 and 47 are then supplied to a data modifying circuit 48 which eliminates from the work program any adverse effect attributable to the parameter errors. The modified work program is then set in an output circuit 49 to be supplied to the robot control device 3 for controlling the operation of the industrial robot 1.

Figure 12:
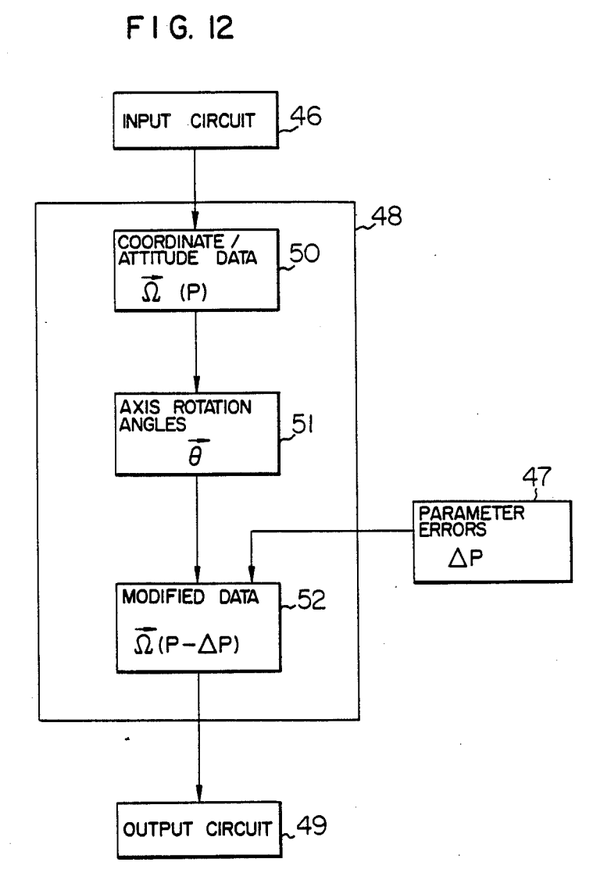
FIG. 12 is a block diagram showing how the data is modified in the data modifying circuit.

The procedure for work program modification in the data modifying circuit 48 will be described with reference to FIG. 12. As described already, the industrial robot 1 is generally controlled on the basis of the rotation angles of the individual axes computed as a result of coordinate transformation of the coordinate/attitude data of the robot hand. Suppose that $\vec{\Omega}$ represents the six-dimensional vectors indicative of the coordinates and attitude of the robot hand, and $\vec{\theta}$ represents the vector representation of the rotation angles of the individual axes of the industrial robot 1. Then, the work program stored in the work program memory device 4 can be expressed as $\vec{\Omega}(P)$, where P is the collective representation of the designed parameter values as described already. In the block 50 in FIG. 12, the coordinate/attitude data $\vec{\Omega}(P)$ are sequentially read out from the input circuit 46 to be transferred to the block 51. In the block 51, coordinate transformation of the coordinate/attitude data $\vec{\Omega}(P)$ is made to compute the rotation angles $\vec{\theta}$ of the individual axes. The rotation angle data $\vec{\theta}$ and parameter errors $\Delta P$ are supplied to the block 52. In the block 52, the parameter errors $\Delta P$ are subtracted from the parameters P to prepare modified data $\vec{\Omega}(P-\Delta P)$ as a function of $(P-\Delta P)$, and the modified data $\vec{\Omega}(P-\Delta P)$ are set in the output circuit 49. As seen in FIG. 12, the procedure for modification according to the present invention is featured by the fact that the coordinate/attitude data $\vec{\Omega}(P)$ of the robot hand are converted once into the rotation angles $\vec{\theta}$ of the individual axes of the industrial robot 1, and the influence of installation errors, mechanism errors and encoder errors are then taken into consideration to finally obtain the modified data $\vec{\Omega}(P-\Delta P)$.

As another procedure which may be employed as an alternative, a separate coordinate transformation formula using the parameters P and parameter errors $\Delta P$ is prepared in the processor 9, so that the rotation angles $\vec{\theta}$ of the individual axes can be directly computed from the coordinate/attitude data $\vec{\Omega}(P)$ while taking the parameter errors $\Delta P$ into consideration. However, such a coordinate transformation formula computing the rotation angles $\vec{\theta}$ from the coordinate/attitude data $\vec{\Omega}(P)$ while taking the parameter errors $\Delta P$ into consideration is quite complex and may not always provide the required analytical solution. In such a case, numerical analysis is required for the solution, resulting in impossibility of attainment of high-speed processing.

In contrast, according to the procedure shown in FIG. 12, the modified data $\vec{\Omega}(P-\Delta P)$ can be universally or easily prepared from the coordinate/attitude data $\vec{\Omega}(P)$ which include the parameters P only and which are indispensably required also for the conventional manner of robot control. Thus, when such modified data $\vec{\Omega}(P-\Delta P)$ are used for the control of the industrial robot 1, the adverse effects of the errors $\Delta P$ of the operating parameters P of the industrial robot 1 can be cancelled within the extent of linear approximation of $\Delta P$, and the industrial robot 1 can be moved to the position with the attitude as commanded by the coordinate and attitude command values provided by the work program.

Thus, according to the modification procedure above described, a previously prepared work program for an industrial robot can be modified to be freed from any position error by virtue of elimination of adverse effects of installation errors, mechanism errors and encoder errors.

It will be understood from the foregoing detailed description of the present invention that installation errors, mechanism errors and encoder errors between the robot coordinate system peculiar to an industrial robot and the absolute coordinate system of the industrial robot on its working site can be efficiently measured. A previously prepared work program for the industrial robot can be easily modified on the basis of the measured errors so that the modified work program is now free from the adverse effects of those errors. As one of the advantages of the present invention, non-necessity of prior art teaching saves the man power and time required for the teaching, and the work with the industrial robot can be made more efficiently and more simplified than hitherto, since the industrial robot can be controlled with high accuracy according to a work program in which the position error of the industrial robot is previously modified offline.

Application of a work program prepared for an industrial robot to another industrial robot has been impossible because installation errors, mechanism errors and encoder errors of the former robot are necessarily different from those of the latter robot. It is another advantage of the present invention that, by detecting the above errors for each of individual industrial robots, a work program prepared for one of the industrial robots can be readily modified to be applied to another industrial robot, and the man-hours required for the teaching can therefore be decreased.

We claim:
1. A method of correcting a position error of an industrial robot, comprising the steps of:
  operating the industrial robot according to position command values, thereby moving a measurement point provided on said industrial robot to a first position;
  measuring the position values of the first position of said measurement point with a three-dimensional measuring unit to obtain three-dimensional coordinates defining the measurement point;
  computing a position error of said industrial robot by defining the coordinates of said measurement point in a first equation incorporating parameters of the robot contributing to said position error, forming partial differential equations from said first equation for each of said parameters contributing to said position error, selecting, from among the partial differential equations formed, individual partial differential equations containing linearly independent partial differential coefficients, and using the measured position values of said measurement point and the coordinates of the position command values to solve the individual partial differential equations selected and thereby compute values of deviations in said parameters contributing to said position error; and using said values of the deviations computed to modify a work program prepared for operating said industrial robot.

2. A method of correcting a position error of an industrial robot as claimed in claim 1, wherein said robot includes a plurality of linked members, further comprised of operating the robot according to said position command values by simultaneously moving a plurality of said members prior to measuring said position values of said measurement point.

3. A method of correcting a position error of an industrial robot as claimed in claim 1, comprising the steps of:

selecting said partial differential equations from among said partial differential equations formed, with the number of said partial differential equations selected being greater in number than the number of deviations in said parameters contributing to said position error; and solving simultaneously the linear partial differential equations selected, thereby computing the values of the ones of said deviations contributing to said position error.

4. A method of correcting a position error of an industrial robot as claimed in claim 1, comprising the steps of:

transforming the coordinate system of said work program into a robot coordinate system defined by the structure of the robot; and transforming the robot coordinate system into an absolute coordinate system including the parameters of the robot contributing to said position error, and modifying said work program by changing the values of said parameters contributing to said position error according to the values of corresponding ones of said deviations.

5. A method of correcting a position error of an industrial robot as claimed in claim 1, wherein said measurement point is located on a hand of said industrial robot, further comprising the step of measuring the attitude of the hand of said industrial robot.

6. A method of controlling an industrial robot having a robot coordinate system defined by the structure of an industrial robot, comprising the steps of:

operating the robot according to position command values to cause movement of a hand of said robot to a first position;

measuring the first position of said robot hand to obtain three-dimensional coordinates defining the actual position of the robot hand relative to the origin of an absolute coordinate system defined independently of the structure of any particular robot by a work site for operation of a plurality of the robots;

computing a position error of said robot by defining the coordinates of said robot hand in a first equation incorporating parameters of the robot contributing to said position error, forming partial differential equations from said first equation for each of said parameters contributing to said position error, selecting from among the partial differential equations formed, individual partial differential equations containing linearly independent partial differential coefficients, and using the measured position values of said robot hand and said position command values with the individual partial differential equations selected to obtain the value of variations in parameters describing relative displacement between the origins and coordinate axes of the absolute and robot coordinate systems and variations in parameters describing elements of the robot;

transforming the coordinate systems of a work program stored in a memory device into the absolute coordinate system including the ones of said parameters which contribute to said position error, modifying said work program by changing the values of said parameters in accordance with the values of said parameter variations, transforming the coordinate systems of the modified work programs into the robot coordinate system peculiar to said robot;

applying said modified work program to control means for controlling said robot; and controlling said robot by said control means in accordance with said modified work program.

7. A method of controlling an industrial robot as claimed in claim 6, wherein said robot includes a plurality of linked members, further comprised of operating the robot according to said position command values by simultaneously moving a plurality of said members prior to measuring the actual position of said hand.

8. A method of controlling an industrial robot as claimed in claim 7, comprising the steps of:

expressing coordinates describing the location of said robot hand by an equation which includes parameters representing the elements of the robot contributing to said position error;

partially differentiaing said equation with respect to a plurality of said parameters to form partial differential equations containing partial differential coefficents of said parameters;

selecting linearly independent ones of said partial differential coefficients from among said partial differential coefficients computed to find the required number of linearly indepenent errors; and using the measured coordinates of said moved position and said position command values for solving said partial differential equations as simultaneous linear equations and thereby computing the values of variations in said parameters contributing to said position error.

9. An apparatus for correcting a position error of an industrial robot having a structure defining a robot coordinate system, comprising:

means for measuring the three-dimensional coordinates relative to an absolute coordinate system defined independently of the structure of any particular robot by a work site for operation of a plurality of the robots, of the position to which a measurement point on the robot has actually moved according to position command values;

means for computing a position error of said measurement point of the robot due to discrepancy between the robot coordinate system and the absolute coordinate system by defining the coordinates of said measurement point in a first equation incorporating parameters of the robot contributing to said position error, forming partial differential equations from said first equation for parameters contributing to said position error, selecting, from among the partial differential equations formed, individual partial differential equations containing independent partial differential coefficients, and using the measured position values of said measurement point and said position command values with the individual partial differential equations selected, to obtain the values of variations in parameters describing differences between the origins and coordinate axes of the absolute and robot coordinate systems; and means for transforming the coordinate system of a work program into the absolute coordinate system including the axes of said parameters which contribute to said position error, modifying said work program prepared for the operation of said robot by changing said parameters on the basis of said computed position error, and transforming the coordinate system of the modified work program into the robot coordinate system peculiar to said robot.

10. An industrial robot having a structure defining a robot coordinate system, comprising:

control device means for controlling the industrial robot in accordance with a work program;

work program memory means for storing said work program;

three-dimensional measuring means for measuring the three-dimensional coordinates relative to an absolute coordinate system defined by a work site for operation of said robot of the position to which said industrial robot has actually moved according to position command values;

error computing means for computing a position error of said industrial robot due to variation between the robot coordinate system relating to the operation of said industrial robot and the absolute coordinate system by defining the coordinates of said measurement point in a first equation incorporating parameters of the robot contributing to said position error, forming partial differential equations from said first equation for each of said parameters contributing to said position error, selecting, from among the partial differential equations formed, individual partial differential equations containing independent partial differential coefficients, and using the measured position values of said industrial robot and said position command values with the partial differential equations selected, to obtain the values of parameters describing differences between the origins and coordinate axes of the absolute and robot coordinate systems; and modifying means for modifying said work program on the basis of said computed position error.

11. A method for correcting a position error of an industrial robot having a plurality of linked members rotatable about a plurality of axes of rotation and a robot coordinate system defined by the structure of the robot, said axes of rotation including a first axis of rotation extending through the origin of said robot coordinate system, comprising:

operating the robot according to position command values to cause movement of a measurement point located on said robot to a first position defined by said position command values;

measuring the position values of said measurement point to obtain three-dimensional coordinates defining the measurement point relative to the origin of an absolute coordinate system defined independently of the structure of any particular robot by a work site for operation of a plurality of the robots;

defining the coordinates of said measurement point in a first equation incorporating parameters of the robot contributing to said position error, forming partial differential equations from said first equation for each of said parameters contributing to said position error, selecting, from among the partial differential equations formed, individual partial differential equations containing independent partial differential coefficients;

using the measured position value of said measurement point and the coordinates of the position command values with the individual partial differential equations selected, to compute the values of deviations in parameters describing elements of the robot and in parameters describing relative displacement between the origins and coordinate axes of the absolute and robot coordinate systems; and using said values of the deviations computed to modify a work program prepared for operating the robot.

12. The method of claim 11, further comprised of using said parameters to describe the lengths of individual ones of said members, the angles of rotation of said axes of rotation about mutually perpendicular axes intersecting at the respective origins defined by corresponding ones of said members and axes of rotation, the rotational angle of each of said axes of rotation relative to said origin of said robot coordinate system, the linear displacement between said origin of the coordinate system of said robot and the origin of said first coordinate system, and the rotation displacement between like axes emanating from corresponding ones of said origins.

13. The method of claim 12, further comprised of computing said values of deviations in said parameters by defining the coordinates of said measurement point in a first equation incorporating said parameters; forming partial differential equations from said first equation for each of said parameters contributing to said position error; selecting, from among the partial differential equations formed, individual partial differential equations containing linerarly independent partial differential coefficients; and using the measured position values of said measurement point and the coordinates of the position command values to solve the individual partial differential equations selected to thereby compute the values of deviations in said parameters contributing to said position error.

14. The method of claim 12, further comprised of transforming the coordinate system of the work program into said robot coordinate system, transforming the robot coordinate system into said absolute coordinate system including the ones of said parameters contributing to said position error, and modifying said work program by changing the values of said parameters in accordance with the values of said parameter variations.

15. The method of claim 12, further comprised of operating the robot according to said position command values by simultaneously moving a plurality of said members prior to measuring said position values of said measurement point.

16. The method of claim 12, wherein said meansurement point is located on a hand of said robot, further comprised of measuring the attitude of the hand.

17. The method of claim 11, further comprised of computing said values of deviations in said parameters by defining the coordinates of said measurement point in a first equation incorporating said parameters; forming partial differential equations from said first equation for each of said parameters contributing to said position error; selecting, from among the partial differential equations formed, individual partial differential equations containing linearly independent partial differential coefficients; and using the measured position values of said measurement point and the coordinates of the position command values to solve the individual partial differential equations selected to thereby compute the values of deviations in said parameters contributing to said position error.

18. The method of claim 17, further comprised of transforming the coordinate system of the work program into said robot coordinate system, transforming the robot coordinate system into said absolute coordinate system including the ones of said parameters contributing to said position error, and modifying said work program by changing the values of said parameters in accordance with the values of said parameter variations.

19. The method of claim 17, further comprised of operating the robot according to said position command values by simultaneously moving a plurality of said members prior to measuring said position values of said measurement point.

20. The method of claim 17, wherein said measurement point is located on a hand of said robot, further comprised of measuring the attitude of the hand.

21. The method of claim 11, further comprised of transforming the coordinate system of the work program into said robot coordinate system, transforming the robot coordinate system into said absolute coordinate system including the ones of said parameters contributing to said position error, and modifying said work program by changing the values of said parameters in accordance with the values of said parameter variations.

22. The method of claim 21, wherein said measurement point is located on a hand of said robot, further comprised measuring the attitude of the hand.

23. The method of claim 11, further comprised of operating the robot according to said position command values by simultaneously moving a plurality of said members prior to measuring said position values of said measurement point.

24. The method of claim 23, wherein said measurement point is located on a hand of said robot, further comprised of measuring the attitude of the hand.

25. The method of claim 11, wherein said measurement point is located on a hand of said robot, further comprised of measuring the attitude of the hand.

* * * * *